(12) United States Patent
Coker

(10) Patent No.: US 8,474,493 B2
(45) Date of Patent: Jul. 2, 2013

(54) LIQUID APPORTIONMENT DEVICE

(76) Inventor: William F. Coker, Jacksonville, FL (US)

( * ) Notice: Subject to any disclaimer, the term of this patent is extended or adjusted under 35 U.S.C. 154(b) by 142 days.

(21) Appl. No.: 13/270,331

(22) Filed: Oct. 11, 2011

(65) Prior Publication Data

US 2012/0085461 A1 Apr. 12, 2012

Related U.S. Application Data

(60) Provisional application No. 61/404,925, filed on Oct. 12, 2010.

(51) Int. Cl.
*B67C 3/00* (2006.01)

(52) U.S. Cl.
USPC ............ 141/247; 141/236; 141/244; 141/365

(58) Field of Classification Search
USPC ........................... 141/234, 236–247, 363–366
See application file for complete search history.

(56) References Cited

U.S. PATENT DOCUMENTS

| | | |
|---|---|---|
| 858,051 A | 6/1907 | Allen |
| 1,528,978 A | 3/1925 | McClellan |
| 2,800,930 A | 7/1957 | De Tilly Blaru |
| 2,872,953 A | 2/1959 | Duncan |
| 3,196,909 A | 7/1965 | Monk |
| 3,664,387 A | 5/1972 | Cates, Jr. |
| 3,732,903 A | 5/1973 | Oales |
| 4,733,680 A | 3/1988 | Mosier |
| 5,092,378 A | 3/1992 | Dunham |
| D344,872 S | 3/1994 | Velez |
| 5,484,002 A | 1/1996 | Kupietzky |
| 5,911,253 A | 6/1999 | Webb |
| 7,308,919 B1 | 12/2007 | Zavala |

*Primary Examiner* — Jason K Niesz

(74) *Attorney, Agent, or Firm* — Thomas C. Saitta

(57) ABSTRACT

A liquid apportionment device having a distribution chamber located within a dispensing chamber, the distribution chamber being mounted onto a pedestal member such that a dispensing channel is defined between the sloping wall of the pedestal and the wall of the dispensing chamber. Dispensing spouts are evenly positioned around the dispensing channel for dispersal of the liquid into individual containers. Three rows of evenly spaced distribution apertures are provided in the distribution chamber, with the top row of distribution apertures oriented horizontally, the middle row of distribution apertures being oriented at 45 degrees, and the bottom row of distribution apertures being oriented vertically.

20 Claims, 3 Drawing Sheets

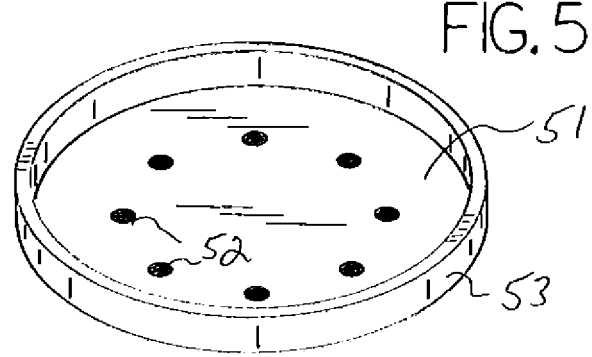
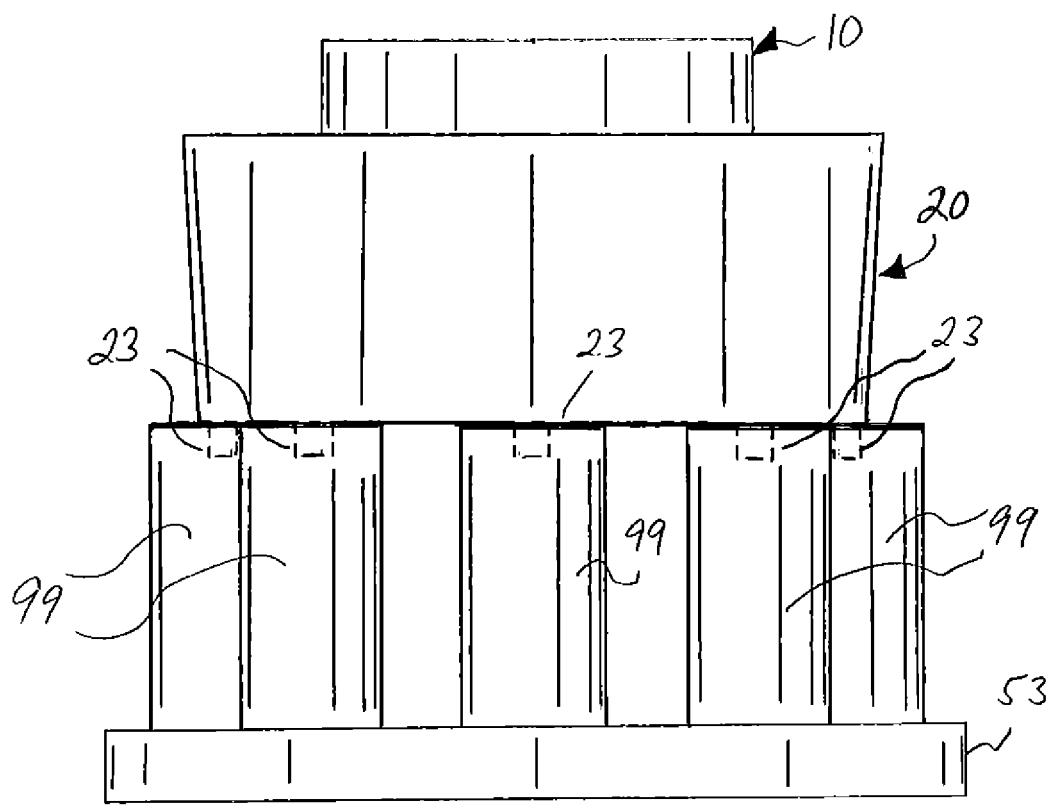

LIQUID APPORTIONMENT DEVICE

This application claims the benefit of U.S. Provisional Patent Application Ser. No. 61/404,925, filed Oct. 12, 2010, the disclosure of which is incorporated herein by reference.

BACKGROUND OF THE INVENTION

This invention relates generally to the field of devices that apportion or divide liquid from a single large container into multiple smaller containers, and more particularly relates to such devices that apportion or divide the liquid into equal amounts.

As a visit to a grocery or convenience store will readily attest, the price per liquid ounce of water, fruit juice, sports drinks, etc. is considerably higher when the drink is purchased in smaller plastic bottles as compared to half-gallon and one-gallon containers. For example, the price for a 64 ounce container of apple juice may be set at $3.99 (or 3.117 cents per ounce) and the price for an 8-pack of 8-ounce bottles of apple juice set at $4.59 (or 7.172 cents per ounce), even though the purchaser is buying the same product.

The reasoning behind customer acceptance of a higher price per ounce for multiple smaller bottles is the convenience factor. Filling individual small bottles one-by-one from a large container using a funnel is a time-consuming and potentially messy process, and most consumers will not make the effort.

It is an object of this invention to provide a liquid apportionment device whereby a plurality of small bottles, glasses or containers can be filled simultaneously from a single larger container in an easy manner. It is a further object to provide such a device whereby the liquid is equally apportioned, such that each smaller container receives the same amount of liquid. It is a further object to provide such a device wherein the number of smaller containers can be varied with only simple changes to the device.

SUMMARY OF THE INVENTION

The liquid apportionment device comprises in general a distribution chamber located within a dispensing chamber, the distribution chamber being mounted, either permanently or removably, onto a pedestal member such that a dispensing channel is defined between the sloping wall of the pedestal and the wall of the dispensing chamber. Dispensing spouts are evenly positioned around the dispensing channel. The distribution chamber is an open-topped member comprising a wall and a sloped (conical or convex) bottom member, the wall and bottom being connected at a curved or angled annular transition junction. Three rows of evenly spaced distribution apertures are provided in the distribution chamber, with the top row of distribution apertures located in the wall and oriented horizontally (i.e., perpendicular to the wall), the middle row of distribution apertures being located in the transition junction and oriented at a 45 degree angle relative to the wall, and the bottom row of distribution apertures being located in the bottom member and oriented vertically (i.e., perpendicular to the wall). An apertured dispersion plate is preferably supported within the distribution chamber a short distance above the bottom member. The liquid apportionment device may further comprise a base tray having locator markings for proper spacing of the containers to be filled. Furthermore, a leveling plate with a bubble level may also be provided to insure that the device is level when used.

With a plurality of containers properly positioned so as to correspond to the locations of the dispensing spouts, the bottom of the dispensing chamber is set onto the upper rims of the containers such that the dispensing spouts are received by the containers. Plugging members may be used to close some of the spouts if the number of containers does not equal the number of spouts. Liquid is rapidly poured from a large container onto the dispersion plate, the liquid passing through the openings of the dispersion plate and onto the sloped bottom, whereby it is directed in all directions to the distribution apertures. The liquid flows through the distribution apertures at 90, 45 and zero degrees relative to vertical and into the dispensing channel, then through the dispensing spouts and into the individual containers.

BRIEF DESCRIPTION OF THE DRAWINGS

FIG. 5 is a view of an embodiment of the base tray.

FIG. 6 is a side view showing the liquid apportionment device positioned upon a plurality of containers.

DETAILED DESCRIPTION OF THE INVENTION

Figure 1:
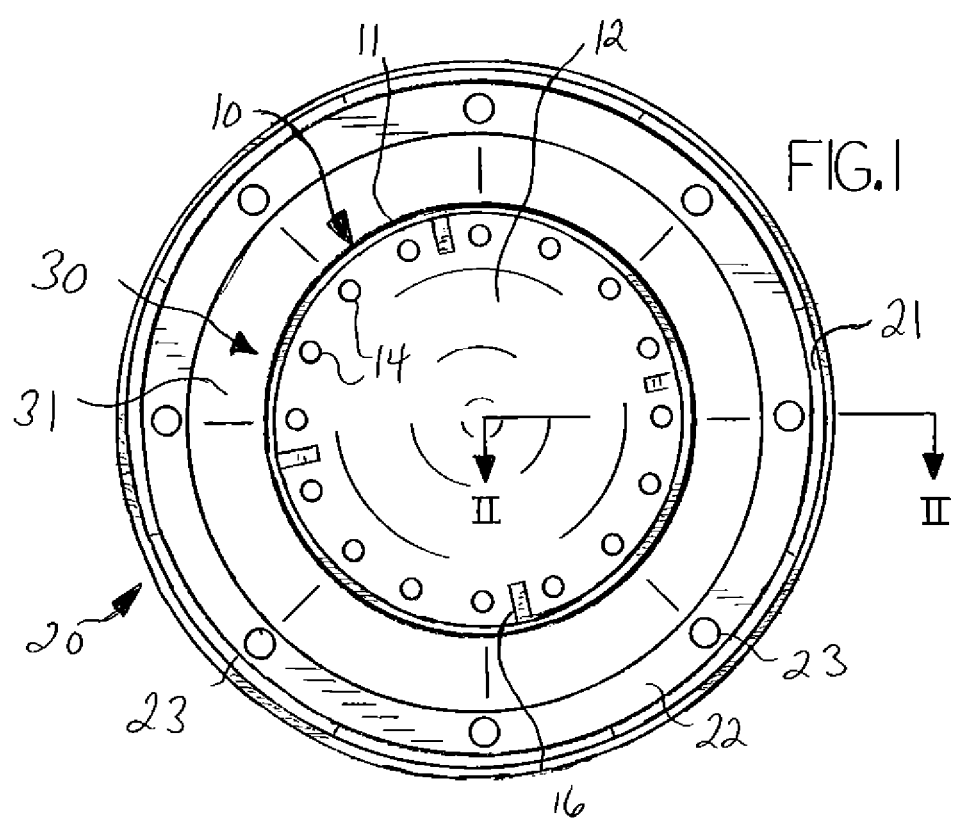
FIG. 1 is a top view of an embodiment the liquid apportionment device.

With reference to the drawings, the invention will be described and shown with regard for the preferred embodiment or embodiments and best mode. In a most general sense, the invention is a liquid apportionment device capable of apportioning a relatively large volume of liquid quickly and evenly into a plurality of smaller containers.

The liquid apportionment device comprises in general a distribution chamber 10 located within a dispensing chamber 20, the distribution chamber 10 being mounted, either permanently or removably, onto a pedestal member 30 portion of the dispensing chamber 20 such that a dispensing channel 22 is defined between the sloping wall 31 of the pedestal member 30 and the wall 21 of the dispensing chamber 20. Dispensing spouts 23 are evenly positioned around the dispensing channel 22. The distribution chamber 10 is an open-topped member comprising a wall 11 (annular or sloped) and a sloped (conical or convex) bottom member 12, the wall 11 and bottom 12 being connected at a curved or angled annular transition junction 13. Three rows of evenly spaced distribution apertures 14 are provided in the distribution chamber 10, with the top row of distribution apertures 14 located in the wall 11 and oriented horizontally (i.e., perpendicular to the wall 11), the middle row of distribution apertures 14 being located in the transition junction 13 and oriented at a 45 degree angle relative to the wall 11, and the bottom row of distribution apertures 14 being located in the bottom member 12 and oriented vertically (i.e., parallel to the wall 11). An apertured dispersion plate 41 is preferably supported within the distribution chamber 10 a short distance above the bottom member 12. The liquid apportionment device may further comprise a base tray 51 having locator markings 52 for proper spacing of the containers 99 to be filled. Furthermore, a leveling plate 61 with a bubble level 62 may also be provided to insure that the device is level when used.

Figure 2:
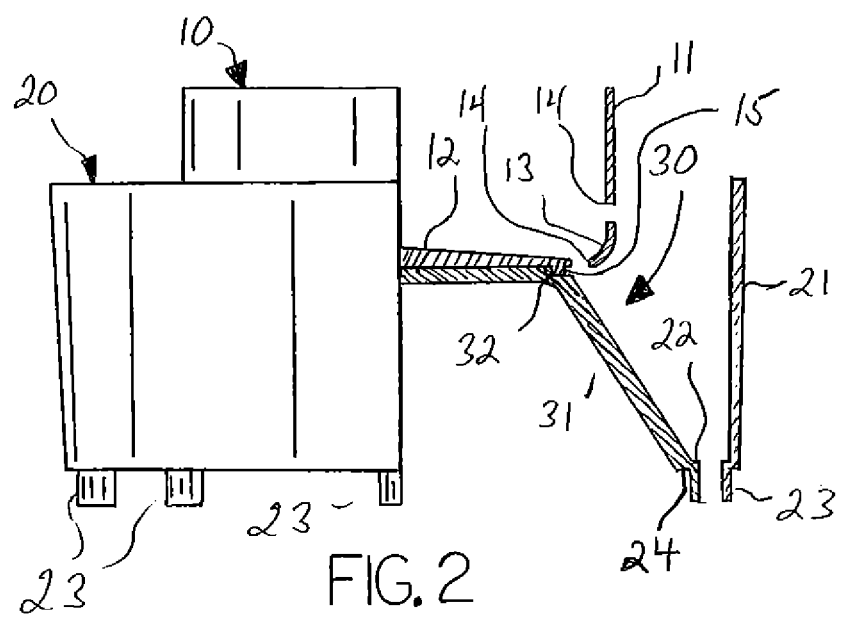
FIG. 2 is a side view of the embodiment of FIG. 1, with a portion of the device shown in cross-section taken along lines II-II of FIG. 1.
Figure 3:
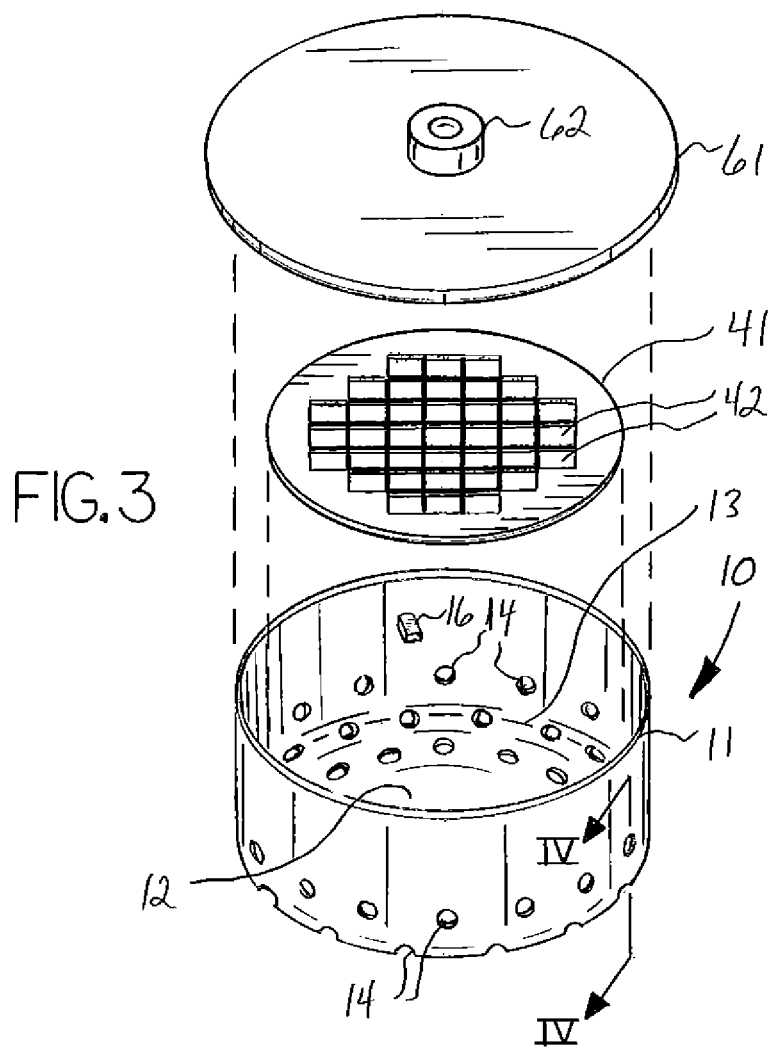
FIG. 3 is an expanded view of an embodiment of the distribution chamber, dispersion plate and leveling plate.

As seen best in FIGS. 1 through 3, the distribution chamber 10 is a bucket-like member, the combination of the wall 11 and bottom member 12 forming a receptacle that would retain a liquid but for the presence of the distribution apertures 14. The distribution chamber 10, as well as other elements of the liquid apportionment device may be comprised of plastic, metal or ceramic, preferably comprising a material that is dishwasher-safe. The bottom member 12 has a surface that slopes downwardly from the center and may be formed with a convex or conical surface. The transition junction 13 is the annular area connecting the outer portion of the bottom member 12 to lower portion of the wall 11 and is preferably curved or angled at 45 degrees relative to the bottom member 12 and wall 11.

Figure 4:
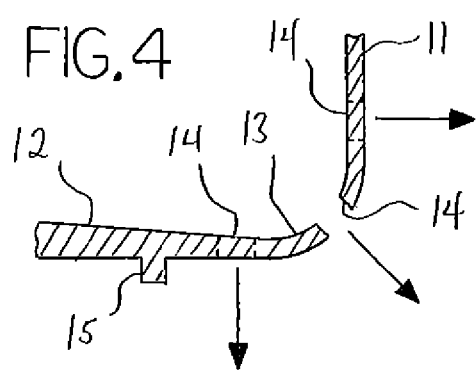
FIG. 4 is a partial cross-sectional view taken along line IV-IV of FIG. 3 and showing the relative positions of the distribution apertures.

The distribution apertures 14 are provided in three rows, each row preferably containing an equal number of apertures 14. Most preferably, there are sixteen apertures 14 in each row, with each aperture 14 being approximately 11/64 inches in diameter. There being sixteen distribution apertures 14 in each row, the apertures 14 will be disposed 22.5 degrees apart in each row. The middle row of apertures 14 is offset from the top and bottom rows. Each of the apertures 14 in the top row are disposed in the wall 11 of the distribution chamber 10 such that the central axis of each aperture 14 is perpendicular to the annual wall 11 (i.e., the axes are horizontal). Each of the bottom row apertures 14 is disposed in the bottom member 12 of the distribution chamber 10 such that the central axis of each aperture 14 is parallel to the wall 11 (i.e., vertically oriented). Each of the apertures 14 of the middle row are positioned in the transition junction 13 of the distribution chamber 10 such that the central axis of each aperture 14 is angled 45 degrees relative to the wall 11 (i.e., 45 degrees to the central axes of either the top row apertures 14 or the bottom row apertures 14). In this manner, liquid passing through the top row apertures 14 exits the distribution chamber 10 in a horizontal stream, liquid passing through the middle row of apertures 14 exits the distribution chamber 10 at a 45 degree angle relative to horizontal, and liquid passing through the bottom row of apertures 14 exits the distribution chamber 10 in a vertical stream, as illustrated in FIG. 4.

For optimum results, a thin, flat dispersion plate 41 having a large number of openings 42 is mounted or suspended within the distribution chamber 10, such as by providing three or more plate support members 16 on the interior of wall 11 a short distance above bottom member 12. Preferably the openings 42 cover the majority of the potential surface area of the dispersion plate 41, such that liquid poured from a large container is deflected somewhat horizontally without significantly impeding the flow rate. Also preferably, the outer diameter of the dispersion plate 41 does not match the inner diameter of the wall 11 such that a gap is present between the dispersion plate 41 and the wall 11. A pouring target may be provided in the center of the dispersion plate 41.

The distribution chamber 10 is positioned onto a conical pedestal member 30. Pedestal member 30 comprises a sloping wall 31 (conical or curved) such that the diameter at the bottom of the pedestal 30 is greater than the diameter at the top of the pedestal 30. In this manner the pedestal sloping wall 31 in combination with the wall 21 of the dispensing chamber 20 defines an annular dispensing channel 22 that is narrower at the bottom than at the top, thus providing a design that creates head pressure during liquid apportionment. The upper surface of the pedestal member 30 is provided with a means for aligning and retaining the distribution chamber 10 against horizontal movement. As shown in the drawings, the pedestal member 30 may be provided with a raised center to define an alignment shoulder 32 which corresponds to an annular alignment flange 15 disposed on the underside of the distribution chamber 10. Alternatively, a tongue-and-groove combination or any other suitable mechanical combination could be utilized. The distribution chamber 10 may be permanently joined to the pedestal member 30, but preferably the distribution chamber 10 is removable for easier cleaning.

The pedestal 30 is connected to the outer wall 21 (preferably inwardly sloping) of the dispensing chamber 20 such that an annular dispensing channel 22 is created. The underside of the dispensing channel 22 defines an annular supporting flange or footer 24. Extending through the bottom of the dispensing channel 22 are evenly spaced dispensing spouts 23, the dispensing spouts 23 being flush with the dispensing channel 22 and extending a short distance, preferably about 5/8 inches downward from the bottom flange 24. With distribution apertures 14 sized and numbered as described above, there should be eight dispensing spouts 23 having 1/4 inch inner diameters, each spout 23 being spaced at 45 degree intervals.

To aid in proper placement of the containers 99 to be filled, a base tray 51 having locator markings 52 may be provided. The base tray 51 may be flat or have a peripheral wall 53. The locator markings 52 correspond to the location of the dispensing spouts 23, such that there will be eight locator markings 52 spaced at 45 degree intervals, the diameter of the circle defined by the locator markings 52 being equal to the diameter of the circle defined by the dispensing spouts 23.

Furthermore, a leveling plate 61 having a bubble level 62 may be provided, the leveling plate 61 temporarily positioned atop the distribution chamber 10 to insure that the device is level. This increases the accuracy of the liquid dispensing, such that less than two percent variation in the fill level of the containers 99 is easily attained. The containers 99 may consist of glasses, cups, mugs, bottles, etc.

With a plurality of containers 99 properly positioned so as to correspond to the locations of the dispensing spouts 23, which as previously explained is simplified through use of the location markings 52 on the base tray 51, the support flange 24 of the dispensing chamber 20 is set onto the upper rims of the containers 99 such that the dispensing spouts 23 are received by the containers 99, as shown in FIG. 6. The support flange 24 of the dispensing chamber may be provided with additional physical elements to insure that the upper rims of the containers 99 are not completely flush with the flange 24 so that air may more readily escape during the filling operation. Plugging members may be used to close some of the dispensing spouts 23 if the number of containers 99 does not equal the number of spouts 23. Liquid is rapidly poured from a large container onto the center of the dispersion plate 41, the liquid passing through the openings 42 of the dispersion plate 41 and onto the sloped bottom 12 of the distribution chamber 10, whereby it is directed in all directions to the distribution apertures 14. The liquid flows through the distribution apertures at 90, 45 and zero degrees relative to vertical and into the dispensing channel 22, the narrowness of the dispensing channel 22 creating head pressure to more rapidly dispel the liquid through the dispensing spouts 23 and into the individual containers 99. The design of the sloping bottom 12 of the distribution chamber 10 and the sloping wall 31 of the pedestal member 30, along with the narrow dispensing channel 22, insure that virtually all of the liquid is quickly and evenly dispensed into the containers 99.

I claim:
1. A liquid apportionment device comprising:
   a distribution chamber received within a dispensing chamber, said distribution chamber comprising a wall, a sloped bottom, and a transition junction connecting said wall to said bottom, said distribution chamber further comprising three rows of evenly spaced distribution apertures, a top row disposed in said distribution chamber wall, a middle row disposed in said transition junction, and a bottom row disposed in said bottom;

said dispensing chamber comprising a pedestal and an outer wall, said pedestal having a sloping wall, the combination of said pedestal sloping wall and said dispensing chamber outer wall forming an annular dispensing channel, wherein said distribution chamber is positioned on said pedestal, said dispensing chamber further comprising evenly spaced dispensing spouts extending through said dispensing channel;

whereby a liquid poured into said distribution chamber is evenly distributed through said distribution apertures into said dispensing channel and then evenly dispersed through said dispensing spouts.

2. The device of claim 1, wherein said three rows of said distribution apertures contain equal numbers of said distribution apertures.

3. The device of claim 1, wherein said distribution apertures of said top row are oriented such that liquid is distributed into said dispensing channel horizontally, said distribution apertures of said bottom row are oriented such that liquid is distributed into said dispensing channel vertically, and said distribution apertures of said middle row are oriented such that liquid is distributed into said dispensing channel at an angle of 45 degrees.

4. The device of claim 1, wherein said outer wall of said dispensing chamber slopes inwardly.

5. The device of claim 1, wherein said distribution chamber is removably positioned on said pedestal.

6. The device of claim 1, wherein the underside of said dispensing channel comprises an annular supporting flange and said dispensing spouts extend through said supporting flange.

7. The device of claim 1, further comprising a dispersion plate mounted within said distribution chamber, said dispersion plate comprising openings allowing passage of liquid therethrough.

8. The device of claim 1, further comprising a leveling plate positionable on said distribution chamber, said leveling plate comprising a bubble level.

9. The device of claim 1, further comprising a base tray, said base tray comprising locator markings corresponding to the location of said dispensing spouts.

10. The device of claim 1, wherein said top row, said middle row and said bottom row each contain sixteen distribution apertures, each said distribution aperture having a diameter of approximately 11/64 inches, and wherein said dispensing channel contains eight said dispensing spouts, each said dispensing spout having a diameter of approximately 1/4 inches.

11. The device of claim 1, wherein said transition junction is curved.

12. The device of claim 1, wherein said transition junction is angled.

13. A liquid apportionment device comprising:
a distribution chamber received within a dispensing chamber, said distribution chamber comprising a wall, a sloped bottom, and a transition junction connecting said wall to said bottom, said distribution chamber further comprising three rows of evenly spaced distribution apertures, a top row disposed in said distribution chamber wall, a middle row disposed in said transition junction, and a bottom row disposed in said bottom;

wherein said top row, said middle row and said bottom row of said distribution apertures each contains an equal number of distribution apertures, and wherein said distribution apertures of said top row are oriented such that liquid is distributed into said dispensing channel horizontally, said distribution apertures of said bottom row are oriented such that liquid is distributed into said dispensing channel vertically, and said distribution apertures of said middle row are oriented such that liquid is distributed into said dispensing channel at an angle of 45 degrees said dispensing chamber comprising a pedestal and an outer wall, said pedestal having a sloping wall, the combination of said pedestal sloping wall and said dispensing chamber outer wall forming an annular dispensing channel, wherein said distribution chamber is positioned on said pedestal, said dispensing chamber further comprising evenly spaced dispensing spouts extending through said dispensing channel;

wherein the underside of said dispensing channel comprises an annular supporting flange and said dispensing spouts extend through said supporting flange;

whereby a liquid poured into said distribution chamber is evenly distributed through said distribution apertures into said dispensing channel and then evenly dispersed through said dispensing spouts.

14. The device of claim 13, wherein said outer wall of said dispensing chamber slopes inwardly.

15. The device of claim 13, wherein said distribution chamber is removably positioned on said pedestal.

16. The device of claim 13, further comprising a dispersion plate mounted within said distribution chamber, said dispersion plate comprising openings allowing passage of liquid therethrough.

17. The device of claim 13, further comprising a leveling plate positionable on said distribution chamber, said leveling plate comprising a bubble level.

18. The device of claim 13, further comprising a base tray, said base tray comprising locator markings corresponding to the location of said dispensing spouts.

19. The device of claim 13, wherein said top row, said middle row and said bottom row each contain sixteen distribution apertures, each said distribution aperture having a diameter of approximately 11/64 inches, and wherein said dispensing channel contains eight said dispensing spouts, each said dispensing spout having a diameter of approximately 1/4 inches.

20. A liquid apportionment device comprising:
a distribution chamber received within a dispensing chamber, said distribution chamber comprising a wall, a sloped bottom, and a transition junction connecting said wall to said bottom, said distribution chamber further comprising three rows of evenly spaced distribution apertures, a top row disposed in said distribution chamber wall, a middle row disposed in said transition junction, and a bottom row disposed in said bottom;

wherein said top row, said middle row and said bottom row of said distribution apertures each contains an equal number of distribution apertures, and wherein said distribution apertures of said top row are oriented such that liquid is distributed into said dispensing channel horizontally, said distribution apertures of said bottom row are oriented such that liquid is distributed into said dispensing channel vertically, and said distribution apertures of said middle row are oriented such that liquid is distributed into said dispensing channel at an angle of 45 degrees said dispensing chamber comprising a pedestal and an inwardly sloping outer wall, said pedestal having a sloping wall, the combination of said pedestal sloping wall and said dispensing chamber outer wall forming an annular dispensing channel, wherein said distribution chamber is removably positioned on said pedestal, said dispensing chamber further comprising evenly spaced dispensing spouts extending through said dispensing channel;

wherein the underside of said dispensing channel comprises an annular supporting flange and said dispensing spouts extend through said supporting flange;

a dispersion plate mounted within said distribution chamber, said dispersion plate comprising openings allowing passage of liquid therethrough;

whereby a liquid poured into said distribution chamber is evenly distributed through said distribution apertures into said dispensing channel and then evenly dispersed through said dispensing spouts.

\* \* \* \* \*